April 18, 1933.  G. H. FREYERMUTH ET AL  1,904,441
PROCESS FOR THE PRODUCTION OF HYDROGEN FROM
REFINERY AND OTHER HYDROCARBON GASES
Filed March 7, 1930
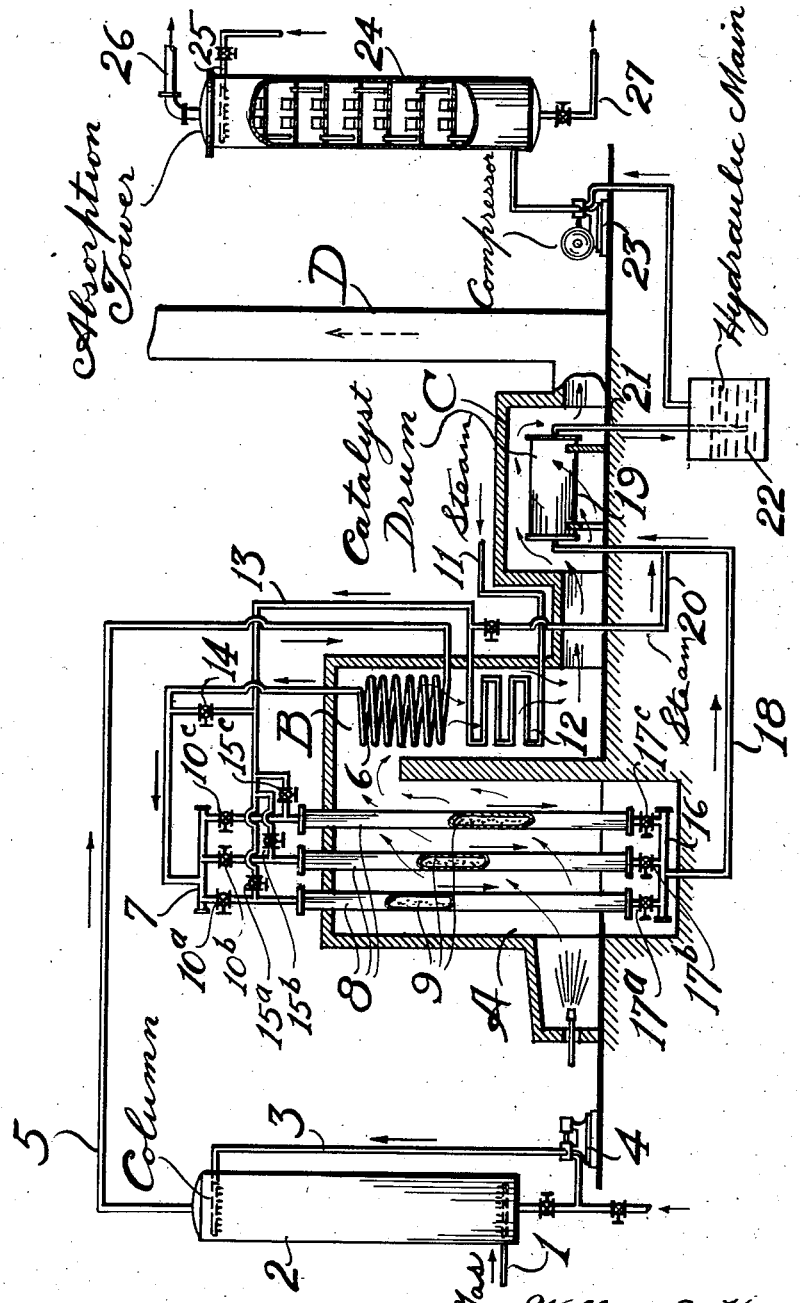

Patented Apr. 18, 1933

1,904,441

UNITED STATES PATENT OFFICE

GEORGE H. FREYERMUTH, OF ELIZABETH, NEW JERSEY, AND JAMES K. SMALL AND WILLIAM V. HANKS, OF BATON ROUGE, LOUISIANA, ASSIGNORS TO STANDARD OIL DEVELOPMENT COMPANY, A CORPORATION OF DELAWARE

PROCESS FOR THE PRODUCTION OF HYDROGEN FROM REFINERY AND OTHER HYDROCARBON GASES

Application filed March 7, 1930. Serial No. 434,036.

The present invention relates to an improved process for the production of hydrogen or gaseous mixtures, rich in hydrogen, from hydrocarbon gases by reaction with steam and to a novel method for carrying out this reaction. The present invention will be fully understood from the following description and the drawing which illustrates the apparatus which may be used for the process.

The drawing is a diagrammatic view in sectional elevation of an apparatus constructed to carry out the process herein described and indicates the flow of the various materials used and the products.

Referring to the drawing, reference numeral 1 indicates the gas line supplying natural or refinery gas from any suitable sources not shown. The gas discharges into the base of a column 2 which is fed at the top with caustic soda, or other suitable agents for removing sulphur, by means of a pipe 3 and a pump 4. The pump is connected to the bottom of the tower so that the purifying solution may be recirculated through the tower. The gas is purified by its contact with the solution and is removed from the top of the tower by a line 5 by which it is conducted to the conversion stages.

A furnace adapted to be fired with oil or gas is shown consisting of three parts, A denoting the high temperature section, B a lower temperature preheating section and C a still lower temperature zone for the final conversion. The combustion gases flow first through section A then through B and C and finally to the stack D. Purified gas is conducted by line 5 to a heating coil 6 which is mounted in section B of the conversion furnace, and the preheated gas flows therefrom into a manifold 7 from which it is distributed to reaction tubes 8 of which only three are shown connected in parallel and mounted in the high temperature section A of the furnace. These tubes are filled with a suitable catalyst indicated at 9 which will be described more fully below. The tubes are connected to the manifold 7 through separate lines fitted with valves 10a—10b and 10c and the gas discharged from the tubes is collected in a manifold 16. The pipes connecting the various tubes 8, to manifold 16 are fitted with valves 17a—17b and 17c. By proper adjustment of the valves gases may be passed through any one or more of the tubes 8 and if desired any tubes may be disconnected and completely withdrawn from the furnace. Steam is forced from line 11 into coil 12 mounted in section B and in flowing therethrough is superheated. It is then conducted by line 13 and admitted to manifold 7 by a valved pipe 14. Connections are also provided between pipe 13 and the various pipes 8, such connections being controlled by valves 15a—15b and 15c respectively. Gases from manifold 16 are conducted by a pipe 18 to a further reaction zone which comprises a catalyst drum 19 mounted in the low temperature zone C of the conversion furnace. Additional steam may be added to the line 18 by means of the pipe 20 and gases discharged from this secondary reaction pass by line 21 into a hydraulic main 22. Cooled gas passes therefrom into a compresser 23, which discharges the gases, at a suitable pressure, into an absorption tower 24 which may be fitted with plates or other contact means. In passing upward through the tower the gas comes in contact with water which is introduced at the top by means of a pipe 25 for the purpose of dissolving carbon dioxide. The purified gas comprising largely hydrogen is removed by line 26 and the scrubbing water is discharged from the base of the tower by line 27. If it is desired to produce a gas containing hydrogen and carbon monoxide, the secondary reaction drum 19 may be omitted, and if the gas is to contain carbon dioxide the scrubber 20 will be eliminated as will be understood.

In the operation of the present process it has been found that natural gas or refinery gases comprising hydrocarbons of a paraffin and olefin series may be converted by means of steam to produce carbon monoxide or carbon dioxide and hydrogen. It is desirable to remove at least the major quantity of sulphur, in the form of hydrogen sulfide or mercaptans, by means of a caustic wash or otherwise.

The primary reaction occurs at a temperature above about 1200° F. with an excess of steam, in the presence of a catalyst comprising nickel with or without other elements or compounds such as alumina, thoria and the like. This reaction results in the formation of hydrogen and carbon monoxide and it has been found that, particularly when operating with unsaturated hydrocarbons, small amounts of carbon or carbonaceous material appear to be deposited on the catalytic surface causing a gradual decline in its activity.

The reaction mixture is passed from the first stage into a second stage at a much lower temperature, for example; about 800° F. and a further excess of steam may be added to the gases. In this step carbon monoxide produced in the first stage is converted into carbon dioxide and additional hydrogen. The second reaction may be catalyzed by a number of suitable materials, of which iron oxide is perhaps the most advantageous. The gas mixture is then suitably cooled and after compression carbon dioxide can be removed to produce a gas consisting essentially of hydrogen with small amount of unconverted methane which is usually not over 1 or 2%.

It has been found, as indicated above, that the nickel catalyst gradually loses its activity due to the deposition of carbon on the active surface and also the reaction with small or even minute quantities of sulphur which may escape the initial purifying step. The decrease in activity makes itself felt in two ways, first by a gradual plugging up of the tubes and consequently a larger pressure drop through the equipment and secondly by an increased quantity of methane or other hydrocarbons in the outlet gas. These two criteria make an excellent means for determining the activity of the catalyst and we have found that the catalyst may be brought back to its original activity by a prolonged action of steam alone. The time required for bringing back catalyst depends largely on the degree of activity remaining, but usually it can be brought back sufficiently in a period of 6 to 24 hours. The temperature during the steam revivification is ordinarily above about 1200° F. and may be conveniently at the same temperature at which the initial reaction is carried out.

We have found that the process may be made substantially continuous in its nature by providing several conversion tubes shown in the drawing, indicated by the number 8 connected in parallel and fitted with suitable valves so that when any one of the tubes becomes inactive the mixture of steam and the hydrocarbon gas may be diverted and replaced by a current of steam, free of hydrocarbons. It is not necessary to disconnect the other end of the tube, thus cut out of the system, from manifold 16, as the exit gases contain only steam, traces of oxides of carbon and hydrocarbons and may be conveniently passed through the second reaction chamber 19. The most desirable mode of carrying out our improved process is to charge the tubes 8 with a suitable catalyst and pass the mixtures of hydrocarbon and steam through all of the tubes in parallel. After a definite period of time which may be from, say, 2 days to 2 weeks, the flow of hydrocarbon gas through one or more of the tubes may be discontinued and steam alone passed through the tubes for about 6 to 24 hours. This tube is then replaced in the line by closing the steam valve and opening the valve controlling the steam-hydrocarbon mixture, and may convert additional quantities of hydrocarbon and steam for another period of 2 days to 2 weeks or more. In the meantime the other tubes may be cut out in rotation, according to a regular schedule, and each given a steaming treatment for six or more hours before it is returned to the system. In this manner large volumes of hydrogen, containing less than 3.5% of methane, or even 2% or less may be produced continuously and each tube may be in operation not less than about 70% of the time. As an example of the operation of this process: A refinery gas containing 43.1% methane, 30.5% saturated hydrocarbons, heavier than methane, 18.7% unsaturated hydrocarbons, 7.7% inert, is passed with 5.5 volumes of steam, per volume of refinery gas through a single tube, containing a catalyst comprising nickel and aluminum oxides, at a temperature of about 1600° F. The outgoing gas after conversion at 800° F. under the influence of iron oxide and additional steam contains less than 2% methane, after two weeks operation the back pressure on the tube is found to have increased from about 5 to 8 pounds per square inch and the outlet gas is found to contain about 3.5% of methane. At this point the hydrocarbon steam mixture is cut off from the system and steam alone is passed through the catalyst for about 24 hours. Thereafter the mixture of hydrocarbon gas and steam is again passed through the tube under the conditions given above and it is found that the methane content is again below 2% and that the back pressure on the tube has decreased to less than 5 pounds per square inch.

It will be understood that the frequency and duration of the steaming periods may be adjusted to produce a gas mixture of any desired methane or hydrocarbon content depending on the character of the gas. Natural gas, composed almost entirely of methane, and free of sulphur may be run for relatively longer periods and requires only a short steaming period, while refinery gases, rich in olefins and containing sulphurous impurities must be revivified more frequently.

The present invention is not to be limited to any theory of the reactions given above, nor to any particular mode of operation which may have been described as an illustrative example, but only by the limitations contained in the following claims, under which we wish to claim all novelty inherent in our invention.

We claim:

1. An improved process for obtaining gas rich in free hydrogen or hydrocarbons which comprises continuously passing hydrocarbon in admixture with steam, over a suitable catalyst, which is incapable of absorbing appreciable amounts of carbon dioxide, while at a temperature in excess of about 1200° F. for a prolonged period until there is evidence of loss of catalytic activity, then passing steam, free of hydrocarbons, over the catalyst for a period of several hours whereby the catalytic activity is regained.

2. Process according to claim 1 in which the catalyst contains nickel.

3. Process according to claim 1 in which the catalyst comprises nickel and alumina.

4. Process according to claim 1 in which the major quantity of the sulphurous impurities are removed from the hydrocarbon prior to catalytic treatment.

5. An improved process for obtaining gas rich in free hydrogen from hydrocarbon gas, comprising maintaining a plurality of catalytic zones containing a catalyst incapable of absorbing appreciable amounts of carbon dioxide, at a temperature in excess of about 1200° F., passing a mixture of hydrocarbon gas and steam concurrently through the catalytic zones for a prolonged period and periodically passing steam free of hydrocarbon gas through each zone in rotation for a short period and thereafter immediately resuming the flow of the hydrocarbon steam mixture through such tubes.

6. An improved process for producing gas mixtures rich in free hydrogen comprising passing mixtures of steam and hydrocarbon gas through a plurality of catalytic reaction zones containing a catalyst incapable of absorbing appreciable amounts of carbon dioxide, connected in parallel at a temperature sufficiently high for reaction, periodically discontinuing the flow of such mixture through each tube in rotation, passing steam alone through such tubes for several hours, then resuming the flow of steam and hydrocarbon gas and adjusting the frequency and duration of such steaming periods whereby the total gas produced contains less than 3.5% hydrocarbon.

7. Process according to claim 6 in which the steaming periods may be from about 6 to 24 hours.

8. Process according to claim 6 in which the frequency and duration of steaming periods is adjusted whereby a gas containing less than about 2% hydrocarbons is obtained.

9. In a process for the production of hydrogen by reaction of hydrocarbon gas and steam over an active nickel-containing catalyst under conditions at which the catalyst shows a decrease in activity with time, an improved method of operation comprising passing steam free of hydrocarbons over the said catalyst at substantially the same temperature as that used for the hydrocarbon steam reaction for a period of several hours whereby the catalyst activity is regained.

10. Process according to claim 9 in which the hydrocarbon gas contains unsaturated hydrocarbons.

11. Process according to claim 9 in which the hydrocarbon gas is a refinery gas.

GEO. H. FREYERMUTH.
JAMES K. SMALL.
WILLIAM V. HANKS.